United States Patent

[11] 3,605,045

[72] Inventor Alan J. Ramsbotham, Jr.
Greenbelt, Md.
[21] Appl. No. 791,322
[22] Filed Jan. 15, 1969
[45] Patented Sept. 14, 1971
[73] Assignee The United States of America as represented by the Secretary of the Navy

[54] WIDE-BAND STRIP LINE FREQUENCY-SELECTIVE CIRCUIT
10 Claims, 9 Drawing Figs.

[52] U.S. Cl. .......... 333/73 S, 333/84 M
[51] Int. Cl. .......... H03h 7/04, H03h 7/08, H01d 3/08
[50] Field of Search .......... 333/73, 73 S, 84, 84 M, 10

[56] References Cited
UNITED STATES PATENTS

| | | | |
|---|---|---|---|
| 3,516,024 | 6/1970 | Lange | 333/84 X |
| 2,859,417 | 11/1958 | Arditi | 333/84 X |
| 2,922,123 | 1/1960 | Cohn | 333/84 X |
| 3,104,362 | 9/1963 | Matthaei | 333/73 |
| 3,460,070 | 8/1969 | Hyde et al. | 333/11 |

OTHER REFERENCES

" Microwave Filters, Impedance-Matching Metworks, and Coupling Structures" Matthaei, Young, Jones McGraw-Hill New York 1964 TK3226M38, pages 168–171

*Primary Examiner*—Herman Karl Saalbach
*Assistant Examiner*—Marvin Nussbaum
*Attorneys*—R. S. Sciascia and J. A. Cook

ABSTRACT: A wide-band frequency-selective microwave circuit having ground planes, dielectric layers, and conductive strip sections. The conductive strip sections are in the same plane and juxtaposed to each other to form resonant circuit elements.

INVENTOR
Alan J. Ramsbotham, Jr.

BY J. O. Tresansky
ATTORNEY

WIDE-BAND STRIP LINE FREQUENCY-SELECTIVE CIRCUIT

BACKGROUND OF THE INVENTION

This invention relates generally to microwave frequency-selective circuits and more particularly to a strip transmission line frequency-selective circuit.

In microwave circuits, as in the case of lower frequency circuits, frequency selection is often required. The use of filters in the microwave frequency range to act as frequency-selective devices has been previously provided. It is often desirable for these filters to be band-pass filters so as to selectively pass a particular range of frequencies within the microwave range. Furthermore, it is often desirable that the bandwidth of these band-pass filters be large to pass frequencies within the bandwidth without attenuation while still rejecting signals having frequencies lying outside the bandwidth.

Heretofore employed conventional two-port filters have been bulky and expensive, and in many cases have not provided the desired operating characteristics. One type of present day filter utilizes slab line construction usually including thick bars in air-filled rectangular cavities. While such slab line filters exhibit suitable wide band-pass characteristics in the microwave frequency range, they are voluminous and heavy. In addition, such slab line filters usually utilize individually tuned resonators which require frequent readjustment. Other conventional filters utilize strip transmission line construction. Such strip line filters have the advantage over filters utilizing slab line construction of ease of manufacture by utilizing, among other techniques, photoetching. Strip line filters are also less voluminous and less heavy than slab line constructed filters. Heretofore, however, strip line filters have not exhibited the desired wide-band operation necessary for many applications. In an attempt to achieve this wide-band operation, parallel-coupled half-wave resonator filters with overlapping lines have been designed. This design, however, suffers from the complication of depositing the component on two separate boards, lying in different planes, which must be accurately aligned and separated by a precise thickness of dielectric. Furthermore, it is often desired to cascade microwave frequency-selective circuits to provide improved rejection of signals having frequencies outside the passband of the filter. Heretofore cascaded filters have proved inadequate for the reasons discussed hereinabove.

Strip line frequency-selective microwave circuits have also been employed as four-port networks. These four-port networks, while exhibiting the advantages of strip line configuration, have not been able to provide desired coupling characteristics.

SUMMARY OF INVENTION

Accordingly, one object of this invention is to provide a new and improved frequency-selective microwave circuit.

Another object of this invention is to provide a new and improved large bandwidth two-port band-pass filter operational in the microwave frequency range.

A still further object of this invention is to provide a new and improved wide band-pass filter operational in the microwave frequency range which may be cascaded.

One other object of the present invention is to provide a new and improved frequency-selective four-port network operable in the microwave frequency range.

Still another object of the instant invention is to provide a new and improved compact frequency-selective microwave circuit which may be easily fabricated in either a balanced, unbalanced, or open configuration.

Briefly, in accordance with one embodiment of this invention, these and other objects are attained by providing a microwave frequency-selective circuit having at least one ground plane, a dielectric layer, and conductive strip sections in one plane parallel to that of the ground plane. The conductive strip sections are juxtaposedly arranged relative to each other over their entire lengths to provide a resonant circuit element. Arranged in the same plane is a further strip section parallel to the resonant circuit element which serves as either an input coupling section or a further resonant circuit element. The network may be cascaded by providing a plurality of strip sections in axial alignment with the juxtaposed strip elements or in axial alignment with the strip section therebetween. Furthermore, the juxtaposed strip sections may be connected electrically in parallel to provide two terminals of a four-port network with the strip section therebetween providing the other two terminals. By splitting up the resonant circuit element into two conductive strips and placing the strips parallel to each side of a further strip section, tighter coupling between elements is produced thereby providing the network with more desirable frequency and coupling characteristics.

SUMMARY OF DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENTS

Figure 1:
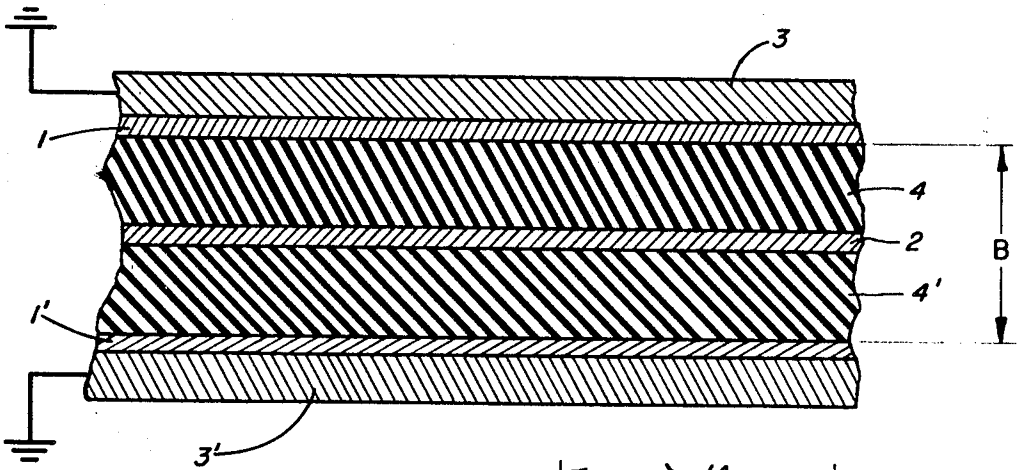
FIG. 1 is a side sectional view of one embodiment of the invention showing a balanced frequency-selective microwave circuit.

Referring now the drawings wherein like reference characters designate identical or corresponding parts throughout the several views, and more particularly to FIG. 1 thereof wherein the frequency-selective microwave circuit of the present invention is shown as consisting essentially of first and second parallel flat conducting layers 1 and 1′ of identical overall configurations separated by a distance B and equidistant from a flat layer 2 of active conductive material. The conductive layers, which typically may be made of a very thin conductive material such as copper, can be advantageously fabricated by known printed circuit techniques. In balanced strip lines, that is strip lines where conductive layer 2 is equidistant from layers 1 and 1′, propagating electromagnetic waves are defined by electric fields extending from the active conductor to both of the parallel conductors wherein the outer parallel conductors 1 and 1′ may be maintained at a common reference potential, such as ground, thereby forming ground panes. Conducting layers 1 and 1′ are attached to metal plates 3 and 3′. Metal plates 3 and 3′ are fixedly connected by any suitable means to conducting layers 1 and 1′ to act as physical supports thereby giving the strip line strength and rigidity, as well as to ground the layers to form the ground planes. The active conducting layer 2 is separated from the ground planes 1 and 1′ by insulating layers 4 and 4′ of identical overall configurations conforming to that of the ground planes. By way of example, insulating layers 4 and 4′ may consist of a low-loss dielectric material such as, for example, polyethylene.

Figure 3:
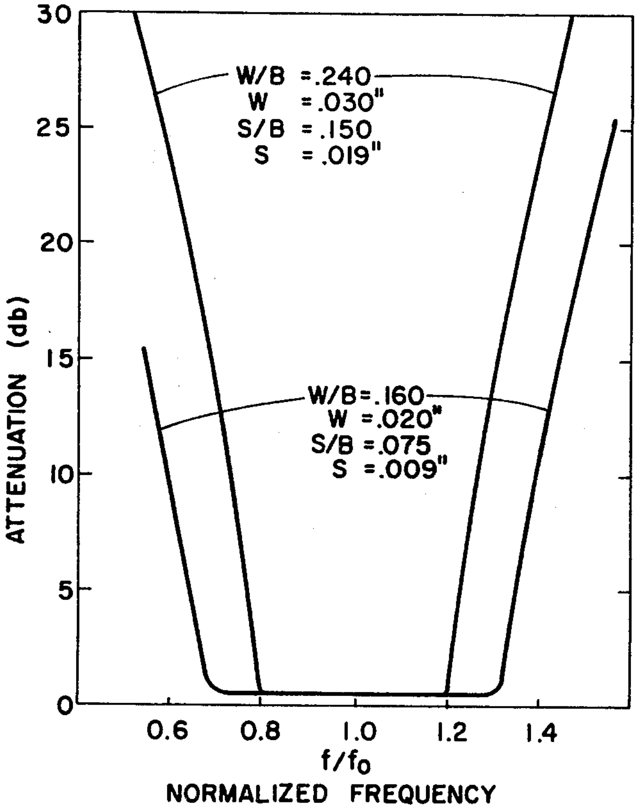
FIG. 3 is a graphical illustration of typical filter performance for the frequency-selective circuit of FIG. 2.
Figure 2:
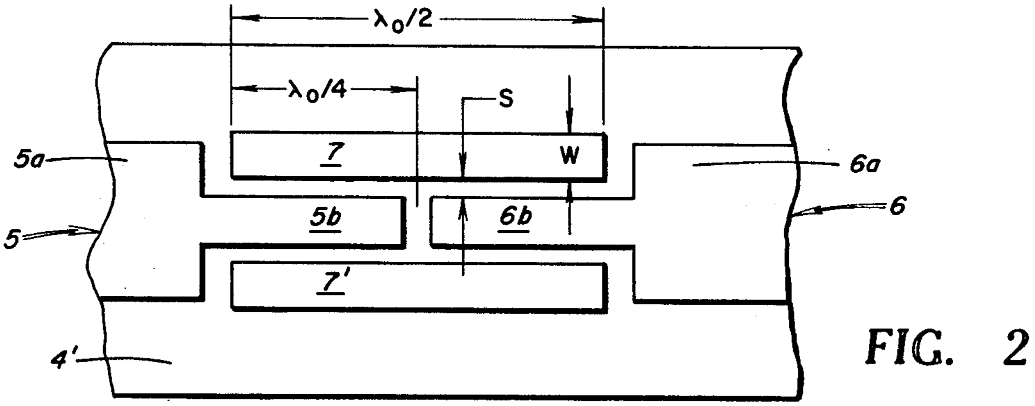
FIG. 2, FIG. 4 and FIG. 5 are plan views of various frequency-selective microwave circuits of FIG. 1 with the top support, ground plane, and dielectric layer removed.

As more clearly shown in FIG. 2, the active conductor 2 may consist of a plurality of elongate conductive strips 5, 6, 7 and 7′ affixed by such techniques as printing, etching, or stamping, onto dielectric layer 4′. Conductive strip 5 consists of a wide input portion 5*a* and a narrow portion 5*b* extending therefrom. Narrow portion 5b constitutes the input coupling section of the band-pass microwave frequency-selective circuit. Conductive strip portion 6b, extending from a wide strip portion 6a, constitutes the output coupling section of conductive strip 6. Conductive strips 5 and 6 are positioned in a spaced axially aligned relationship. Wide strip portions 5a and 6a may be adapted to provide input and output terminals for the band-pass filter. On each side of elements 5b and 6b and in the same plane thereof are strips 7 and 7' which together act as a single resonant circuit element. As readily shown on FIG. 2, strips 7 and 7' are of width W, length λo/2 where λo is the wavelength in the transmission medium corresponding to the resonant frequency $f_0$ at the center of the filter band-pass and are separated from strips 5b and 6b by a distance S. Situated between the resonant element 7 and 7' and parallel thereto for a distance λo/4 each are input and output coupling sections 5b and 6b thereby forming a filter having two quarter-wave sections. Resonant element strips 7 and 7', while disposed on both sides of input coupling section 5b and output coupling section 6b, function as a single element and, in fact, act as if they were electrically connected in parallel. By so splitting up the resonant element and situating it on each side of the input coupling strip 5b, tighter coupling is provided and an impedance ratio favorable to broadband operation is obtained. While prior art strip line band-pass filters are capable of providing a bandwidth equal to approximately 15 percent of the resonant frequency ($0.15f_o$), the strip line of the instant invention may provide bandwidths equal to approximately 67 percent of the resonant frequency (3 db., is wide, the attenuation in the f$_o$). It will be apparent, therefore, that a substantial increase in bandwidth is obtained while ease of construction and fabrication is retained. It may be seen from FIG. 3, which shows the filter characteristics, attenuation vs. normalized frequency, that various choices of strip width W, spacing between the strips S, and distance between ground planes B, can produce various desired characteristics. The various dimensions may be considered to be a matter of design. It is to be noted that the characteristics indicate that the bandwidth, defined as the frequency range around the resonant frequency required for the attenuation to increase 3 db. is wide, the attenuation in the band-pass region is constant and presents a flat response and the rolloff, i.e., the rate of increase in attenuation with respect to frequency outside of the passband, is also good.

Figure 4:
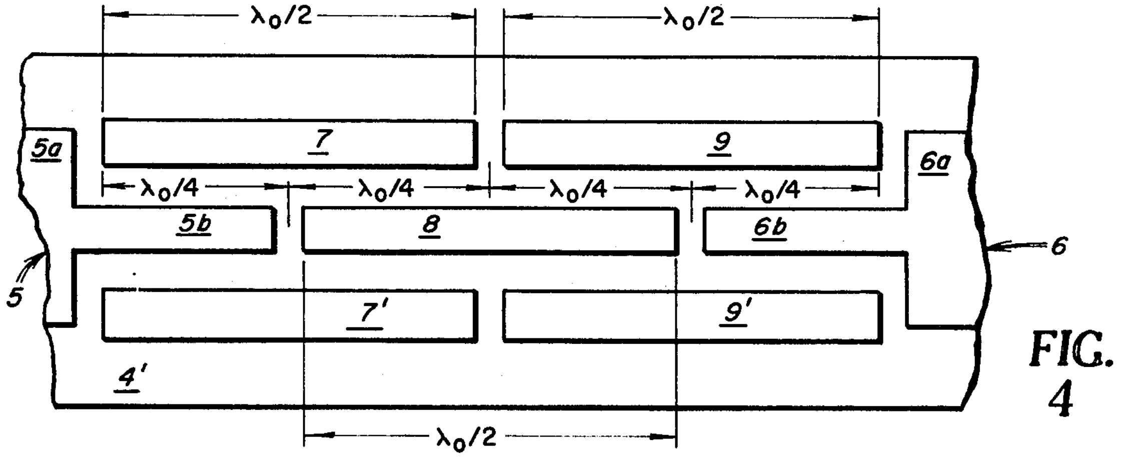
Figure 5:
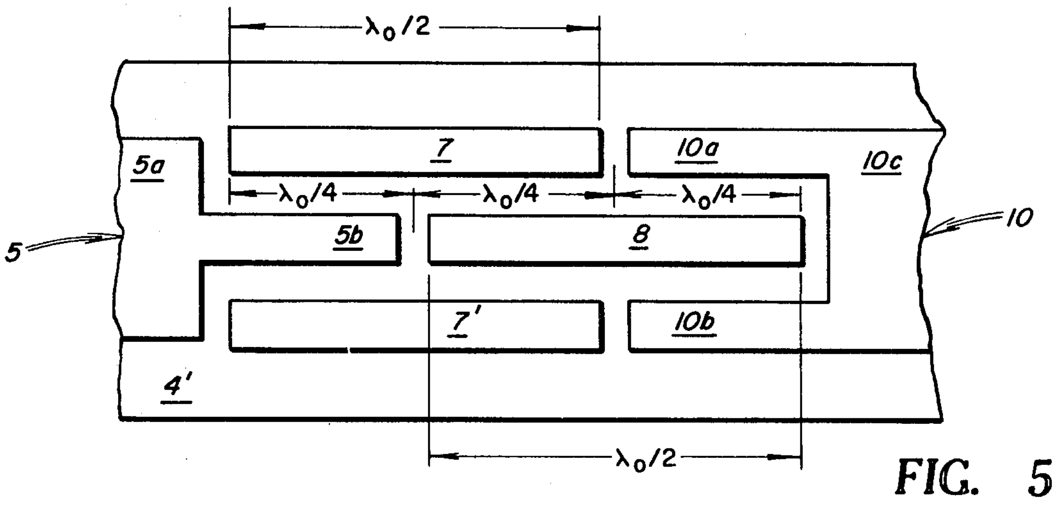

In addition to providing a wide bandwidth for single resonant filters, the inventive concept lends itself to providing desirable characteristics for cascaded resonant elements. As more clearly shown in FIG. 4 and FIG. 5, the strip line filter may include an input coupling section 5b, and a first resonant element section 7, 7' similar to that in FIG. 2. Additionally, the filter may be cascaded by including a second resonant element 8 section of length λo/2 longitudinally aligned with the input coupling section. As seen in FIG. 4, the second resonant element 8 is axially aligned with and intermediate of the input and output strip sections 5b and 6b. It will be apparent, however, that a plurality of strips intermediate to and axially aligned with the input and output coupling sections may be included. Resonant element 8 is parallel to resonant element 7, 7' and lies therebetween for a distance approximately λo/4. Similarly, axially aligned with resonant element 7, 7' are strip sections 9 and 9' which form a third resonant element section of length λo/2. Resonant element 9, 9' is parallel and adjacent to resonant element 8 and output coupling section 6b for a distance λo/4, respectively. It is apparent, therefore, that a plurality of strip sections acting as resonant element sections axially aligned with the first resonant element section 7, 7' may be included. Thus, while FIG. 4 shows only three resonant element sections 7 and 7', 8, and 9 and 9', the number may be readily increased by including further strip sections to produce further cascaded resonant elements. More specifically, while the invention as embodied in FIG. 4 has been shown for $n$=4, where $n$ is equal to the number of quarter-wave sections λo/4, it is readily understood that the number of resonant elements in FIG. 4 readily may be extended thereby providing a filter having any even value of $n$. By way of further example, FIG. 5 shows a wide-band band-pass filter similar to FIG. 4 including input coupling section 5b, first resonant element 7 and 7', and second resonant element section 8. Conductive strip section 10 consists of output coupling section 10a and 10b axially aligned with strips 7 and 7' and a wide strip section 10c which may be adapted as an output terminal. Resonant element 8 lies parallel to and in between output section 10a and 10b for a distance λo/4. As readily seen, the arrangement of strip sections provides a wide-band band-pass filter having three quarter-wave sections ($n$=3). However, it will be readily apparent that the number of resonant element sections may be increased thereby providing a cascaded filter having any odd number of quarter-wave sections.

Figure 6:
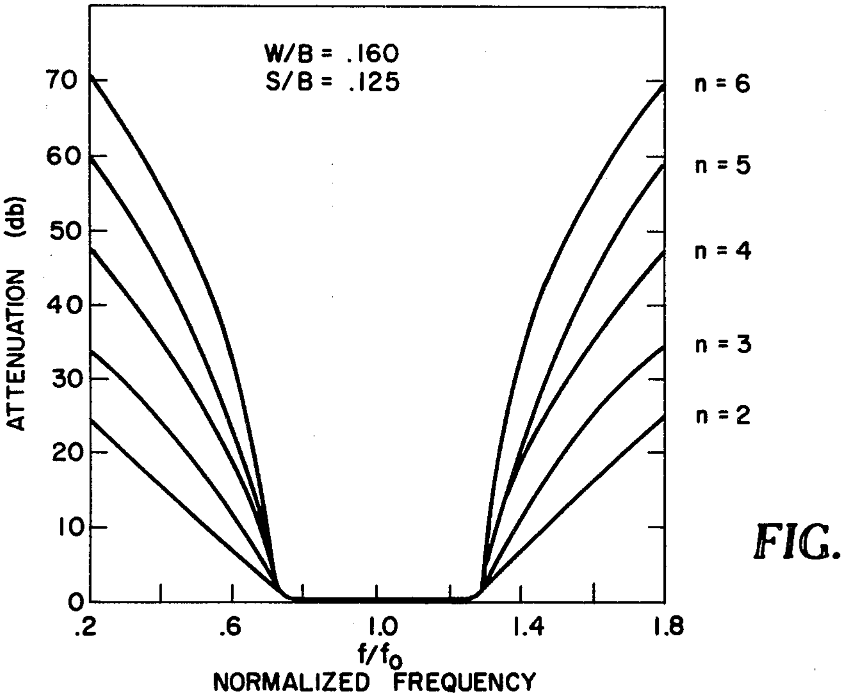
FIG. 6 is a graphical illustration of typical filter performance for the frequency-selective circuits of FIGS. 4 and 5.

As indicated in FIG. 6 showing the frequency characteristics of the circuit of FIGS. 4 and 5, attenuation vs. normalized frequency, the cascading of the resonant element sections provides a band-pass filter exhibiting a wide bandwidth and good rolloff and indicates that increasing the number of quarter-wave resonant sections provides a filter having sharper rejection outside the band-pass range.

Figure 7:
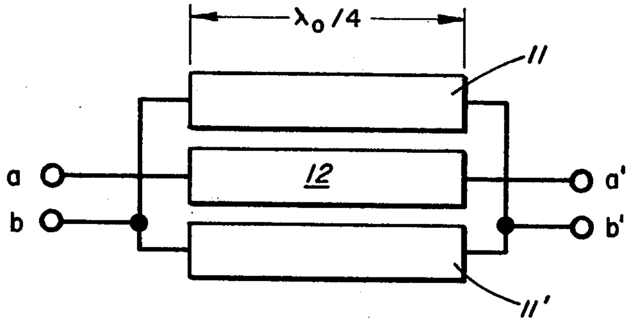
FIG. 7 is a schematic of the invention utilized as a four-port network.

In addition to providing a wide bandwidth for a two-port band-pass filter, the instant inventive concept also is capable of providing a four-port network having desirable operating characteristics as indicated in the embodiment of FIG. 7 wherein a four-port network is schematically shown as including conductive strips 11 and 11' which are juxtaposed a distance λo/4 over their entire lengths. Parallel to and lying in between strips 11 and 11' is a conductive strip 12 having terminals $a$ and $a'$. Conductive strips 11 and 11' are connected electrically in parallel and are connected to terminals $b$ and $b'$. Wherein prior art four-port networks were capable of providing 10 db. attenuation at one output terminal, the splitting up of strips 11 and 11', placing them on each side of strip 12 parallel thereto, and connecting 11 and 11' in parallel provides a four-port network wherein 3 db. attenuation at the output terminal may be obtained by providing closer coupling between strip 12 and strips 11, 11'.

It is further apparent that the inventive concept of the instant invention may also be embodied by using other than a balanced strip line configuration. Thus, the frequency-selective network may be embodied in either an unbalanced or single ground plane configuration.

Figure 8:
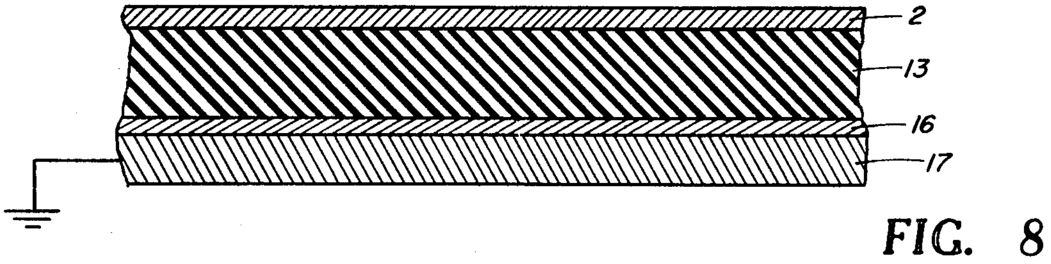
FIG. 8 and FIG. 9 are sectional views similar to that of FIG. 1 showing a single layer and an unbalanced frequency-selective circuit, respectively.
Figure 9:
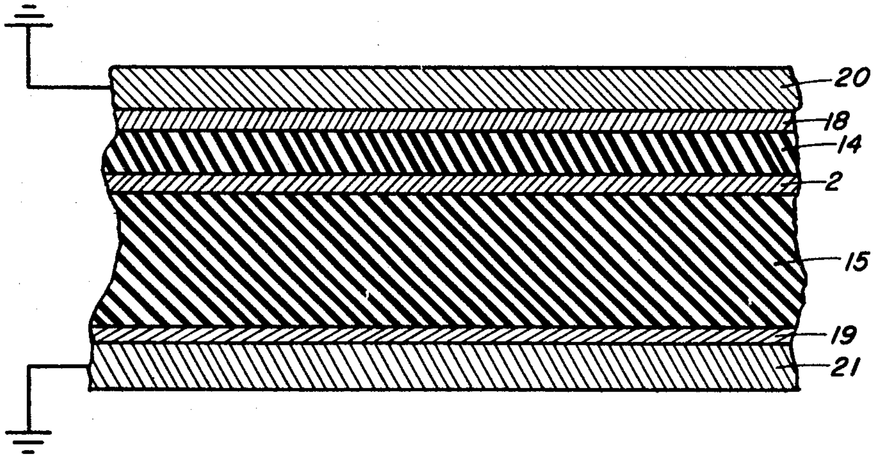

As more clearly shown in FIG. 8 and FIG. 9, conductive strip layer 2 may be contiguous with and parallel to a single dielectric layer 13 or two dielectric layers 14 and 15 of unequal thickness. Dielectric layer 13 is atop and in conformity with conductive layer 16 attached to metal plate 17 which are similar to the corresponding elements of FIG. 1. Furthermore, dielectric layers 14 and 15 are atop and in conformity with conductive layers 18 and 19 which are affixed to metal plates 20 and 21, respectively. These elements are similar to the corresponding elements of FIG. 1. By arranging the frequency-selective microwave circuit, either as a four-port or as a two-port, on a single ground plane or in an unbalanced system (two ground planes but not equidistant the center conducting layer) various modifications of the improved characteristics shown in FIG. 3 and FIG. 6 may be obtained.

It will be apparent that the networks of the herein described invention achieves desirable and superior attenuation and frequency characteristics. It will also be apparent that although the invention has been described in connection with a dielectric-filled transmission network, it is not so limited, and is equally applicable to other transmission networks such as, for example, air-filled ones.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A microwave frequency-selective circuit having a resonant wavelength λo comprising
   a first conductive layer adapted to be maintained at a reference potential,
   a first layer of dielectric material disposed atop said first conductive layer, and
   a plurality of elongate conductive strip sections located in a plane parallel to and contiguous with said first layer of dielectric material, at least two of said strip sections disposed in parallel-spaced relation with each other of length at least λo/4 and juxtaposed over their entire lengths to provide a circuit element resonant within the operating range of said frequency-selective circuit, at least one strip section parallel to said two strip sections and lying therebetween for at least a distance λo/4 to provide a coupling section for said frequency-selective circuit.

2. A microwave frequency-selective circuit according to claim 1 wherein
   said coupling section provided by said strip section parallel to said two strip sections is an input coupling section,
   said two strip sections are of length approximately λo/2, and
   said plurality of elongate conductive strip sections further includes a strip section for providing an output coupling section.

3. A microwave frequency-selective circuit according to claim 2 wherein
   said output coupling section is in axial alignment with said input coupling section.

4. A microwave frequency-selective circuit according to claim 2 wherein
   said output coupling section is in axial alignment with said resonant circuit element.

5. A microwave frequency-selective circuit according to claim 3 wherein
   said elongate conductive strip sections include at least one strip section of length approximately λo/2 intermediate of and axially aligned with said input and output coupling sections and at least one pair of strip sections of a length approximately λo/2 axially aligned with said resonant circuit element.

6. A microwave frequency-selective circuit according to claim 1 wherein
   said two strip sections are connected electrically in parallel and include two terminals, and
   said strip section parallel to said two strip sections includes two additional terminals.

7. A microwave frequency-selective circuit according to claim 6 wherein
   said strip sections are of a length approximately λo/4 and juxtaposed over their entire lengths,
   said two terminals are at opposite elongate ends of said two strip sections, and
   said two additional terminals are at opposite elongate ends of said strip section parallel to said two strip sections.

8. A microwave frequency-selective circuit according to claim 1 further comprising
   a second layer of dielectric material atop and contiguous with said plurality of elongate conductive strip sections and located in a plane parallel to said first dielectric layer, and
   a second conductive layer adapted to be maintained at a reference potential atop and contiguous with said second layer of dielectric material and parallel to said first conductive layer.

9. A microwave frequency-selective circuit according to claim 8 wherein
   said plurality of elongate conductive strip sections is equidistant from said conductive layers.

10. A microwave frequency-selective circuit according to claim 8 wherein
   said plurality of elongate conductive strip sections is closer to one conductive layer than the other conductive layer.